United States Patent
Wilde et al.

(10) Patent No.: US 8,043,416 B2
(45) Date of Patent: Oct. 25, 2011

(54) SYSTEM AND METHOD FOR CONTROLLING FOAM IN A PRINTING SYSTEM

(75) Inventors: Oren Wilde, Rishon Le Zion (IL); Yavin Atzmon, Corvallis, OR (US); Vadim Genkin, Gealia (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 11/993,086

(22) PCT Filed: Jun. 23, 2005

(86) PCT No.: PCT/US2005/022482
§ 371 (c)(1),
(2), (4) Date: Sep. 5, 2008

(87) PCT Pub. No.: WO2007/001293
PCT Pub. Date: Jan. 4, 2007

(65) Prior Publication Data
US 2009/0199714 A1    Aug. 13, 2009

(51) Int. Cl.
*B01D 19/00* (2006.01)
(52) U.S. Cl. .............. 95/242; 347/84; 347/92; 96/177
(58) Field of Classification Search ............ 95/242, 95/261, 176, 177, 217; 347/92, 84; 427/240, 427/294, 295, 297, 298, 420; 96/176–180; 416/180; 261/83–87, DIG. 26
See application file for complete search history.

(56) References Cited

U.S. PATENT DOCUMENTS

| | | | |
|---|---|---|---|
| 3,501,414 A | | 3/1970 | Mueller |
| 3,942,770 A | * | 3/1976 | Belouet et al. ............... 366/343 |
| 4,508,546 A | * | 4/1985 | Zlokarnik ...................... 95/242 |
| 5,447,753 A | * | 9/1995 | Noda et al. .................... 427/296 |
| 6,234,621 B1 | * | 5/2001 | Musser et al. .................. 347/92 |
| 6,280,143 B1 | * | 8/2001 | Parker et al. ............. 416/186 R |
| 6,312,119 B1 | * | 11/2001 | Kocher et al. .................. 347/92 |
| 7,097,287 B2 | * | 8/2006 | Nakao et al. .................... 347/85 |
| 7,449,051 B2 | * | 11/2008 | Olsen ............................. 95/242 |
| 2002/0158950 A1 | * | 10/2002 | Altendorf ....................... 347/92 |
| 2003/0183081 A1 | * | 10/2003 | Gaus et al. ..................... 95/242 |
| 2004/0091357 A1 | * | 5/2004 | Reinfeld et al. .............. 416/185 |

FOREIGN PATENT DOCUMENTS
GB   1181877 A   2/1970

OTHER PUBLICATIONS
PCT International Search Report; Patent Application No. PCT/US2005/022482; filed Jun. 23, 2005; Report issued Feb. 24, 2006.

* cited by examiner

*Primary Examiner* — Duane Smith
*Assistant Examiner* — Thomas McKenzie

(57) ABSTRACT

A member for controlling foam in a material reservoir includes a body, a concave space in the body, and wings extending from the body in the concave space. A method of controlling foam in an ink reservoir of a printing system includes rotating a foam control member above ink in the reservoir to dissipate accumulated foam, where the member includes a concave space open toward the ink and wings extending in the concave space.

17 Claims, 4 Drawing Sheets

SYSTEM AND METHOD FOR CONTROLLING FOAM IN A PRINTING SYSTEM

BACKGROUND

Printing for a variety of purposes has been indispensable to society for a long time. Printed products are mass produced, produced in-house by large to small enterprises and produced for personal use on home printing systems. Printing enables the sharing of documents, record keeping and many other important functions.

Relatively large-scale or commercial printing systems require relatively large amounts of ink or other printing fluid. The ink is selectively deposited on a print medium, such as paper, to form a printed document.

Because of the large quantity of ink required in some printing systems, ink tanks or reservoirs may be installed to provide the relatively large amount of ink needed for production with such a printing system. Frequently, these tanks are open or loosely sealed at the top so that additional ink can be readily added or ink levels can be monitored by the system operator.

However, as ink is circulated into and out of such tanks, the circulation tends to introduce air into the liquid ink. This causes foaming.

In an open tank, this foam can frequently build up until it overflows the tank. In other cases, the accumulated foam may saturate or penetrate the seal on the tank. In either case, the result is a mess that stains and may degrade equipment as well as a loss of ink that could otherwise be used in the printing process.

SUMMARY

An example of a member for controlling foam in a material reservoir includes a body, a concave space in the body, and wings extending from the body in the concave space.

An example of a method of controlling foam in an ink reservoir of a printing system includes rotating a foam control member above ink in the reservoir to dissipate accumulated foam, where the member includes a concave space open toward the ink and wings extending in the concave space.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes an exemplary foam control member that can be installed in a material tank or reservoir to prevent foam from building up and overflowing the tank or penetrating a seal on the tank. The foam control member is installed so as to be rotated above the ink or other material in the tank or reservoir where foam forms and is accumulated. The foam control member may be installed on a rotating drive shaft, for example, a shaft for driving an ink pump. The foam control member is rotated above any foam in the tank to agitate the foam so as to break up or dissipate the foam before any overflow or seal penetration occurs.

As used herein and in the appended claims, the term "printing system" shall be used to describe any system that uses ink or other marking fluid to produce hardcopy documents. Also, as used herein and in the appended claims, the term "ink" shall be used broadly to refer to any fluid used in a printing system to produce a hardcopy document. Thus, the term "ink" may include, but is not limited to, ink, toner, colorant, marking fluid, printing fluid, etc.

Figure 1:
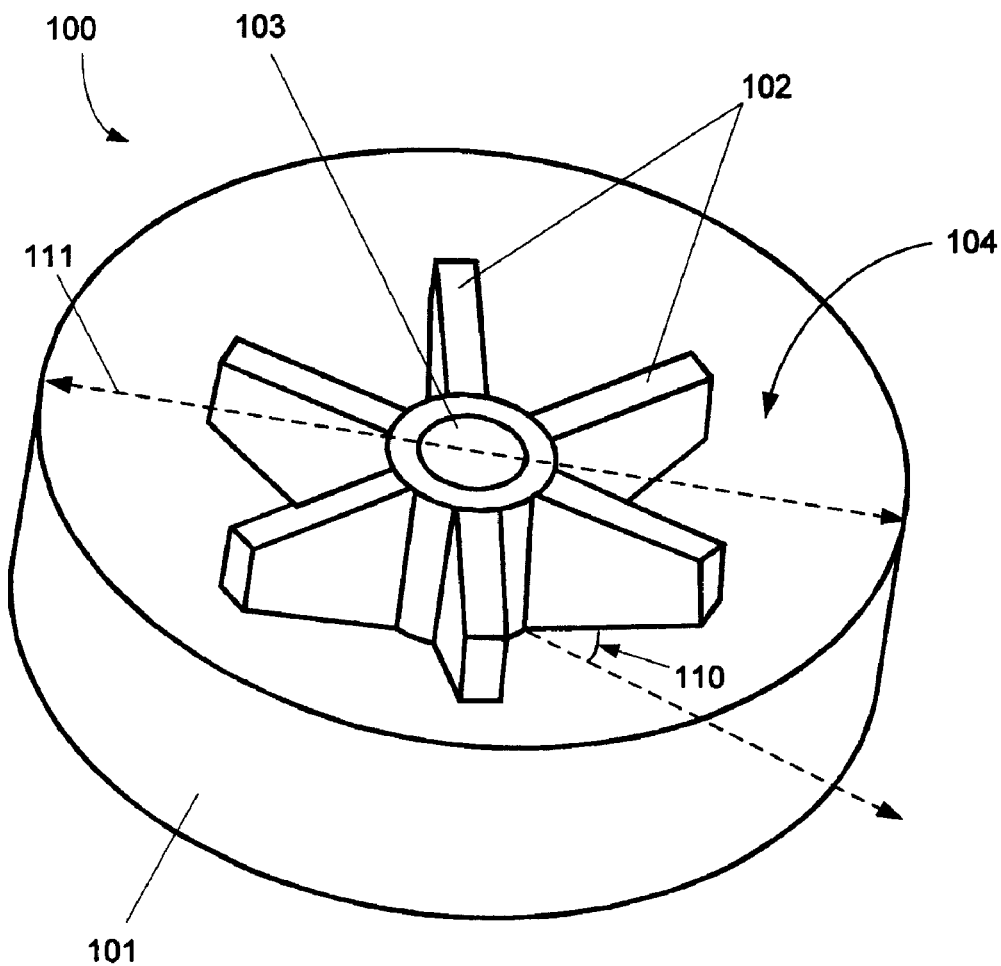
FIG. 1 is an illustration of an exemplary foam control or foam breaking member that can be used to prevent the build-up of foam in a material reservoir according to principles described herein.

Turning to the figures, FIG. 1 is an illustration of an exemplary foam control member that can be used to prevent the build-up of foam in a material tank according to principles described herein. While the present exemplary foam control member may be used to prevent the build-up of foam in any tank with foam overflow issues, the present exemplary foam control member and use thereof will be described, for ease of explanation only, in the context of an ink tank associated with an image printing system. As shown in FIG. 1, the foam control member (100) is generally shaped as a disk with a round or circular body (101). The thickness of the body (101) may vary as suits a particular application.

Within the body (101) is a concave space (104). This concave space (104) may be shaped like a cone. In other examples, the space (104) may have a parabolic shape like an umbrella.

In the example illustrated if FIG. 1, the body (101) is shaped like a disk. However, other configurations are also effective. Thus, the body (101) of the member (100) is not necessarily shaped as a disk.

Figure 2:
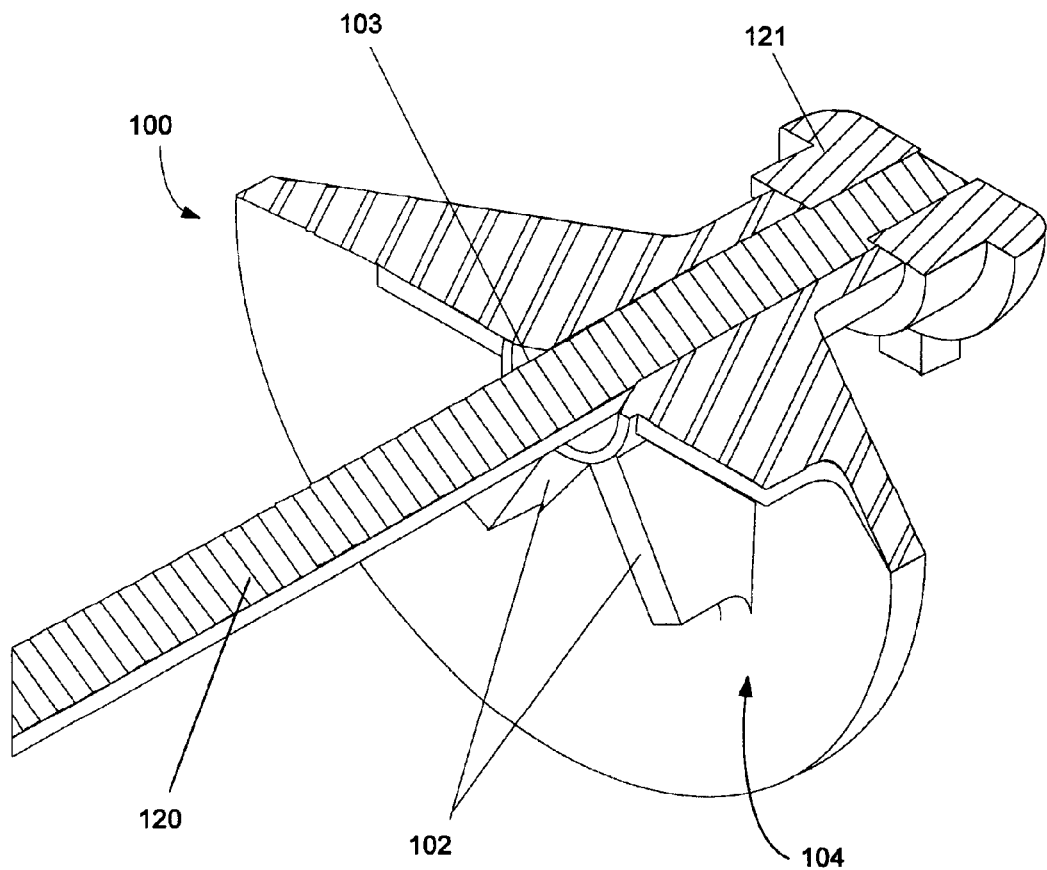
FIG. 2 is a cross-sectional view of the foam control member of FIG. 1 as installed on a drive shaft according to principles described herein.

The exterior of the foam control member (100) may be conical, parabolic or some other shape as conforms to, or accommodates, the concave space (104). For example, FIG. 2 illustrates that the body of the member (100) may be conical in shape. In the example of FIG. 2, the concave space (104) and the body (101) may both have a conical shape.

However, the concave space and the body of the member may have different shapes, as in the example of FIG. 1. Alternatively, the concave space (104) may have a parabolic shape, while the exterior of the body (101) has a conical shape, or vice versa.

Within the concave space (104), a number of extensions or wings (102) extend from the surface of the concave space (104). As shown in FIG. 1, these wings (102) may be arranged radially around the center of the circular body (101) of the foam control member (100).

In the example of FIG. 1, six wings (102) are shown and are spaced equally around the center of the member (100), each arranged along a radius of the member (100). This arrangement, however, is merely exemplary. More or fewer wings (102) could be used as best suits a particular application.

At the center of the member (100), is a hole or socket (103). In the illustrated example, this socket (103) is used to receive a drive shaft or to dispose the member (100) on a drive shaft so that the member (100) can be rotated at or above an accumulation of foam in an ink reservoir. This arrangement will be illustrated and described in more detail below.

When in position, the concave space (104) opens downward and the wings (102) of the member (100) extend downward toward the surface of the ink where foam will form and accumulate. Consequently, the illustration of FIG. 1 shows the member (100) upside down of how the member (100) would be installed when in use.

The dimensions of the member (100) have been discovered to be important in optimizing the operation of the member (100). While the ink reservoir where the member (100) is used to control foam accumulation may be relatively large and have a relatively large ink surface area, the member (100) can be relatively small, but still effective at controlling foam accumulation over the entire ink surface area.

When the member (100) is rotated, the shape of the member (100), including the wings (102) and the surface of the concave space (104), will tend to draw foam into the spinning member, particularly into the concave space (104). This foam will be broken up and flung by the wings (102) of the rotating member (100) across the surface of the ink over which the member (100) is disposed. Consequently, the operation of the member (100) will control foam accumulation over the entire surface of the ink while allowing the member (100) to be much smaller than the surface of the ink or the open area of the ink reservoir.

As shown in FIG. 1, the member (100) has a diameter (111). This diameter may be, for example, 50 mm. As indicated, however, this relatively small diameter for the member (100) can control foam accumulation over a much larger area.

Another significant parameter is the angle (110) of the concave area (104). As illustrated in FIG. 1, this angle (110) is represented as the angle between a line drawn horizontally through the body (101) of the member (100) and the edge of wing (102) that runs along the surface of the concave area (104) or the surface of the concave area (104) itself. This angle (110) may be, for example, about 35 degrees or less. In one example, the angle (110) is 25 degrees. If the angle (110) is not properly proportioned, the member (100) may be ineffective at controlling foam. However, the range of angles described herein has been shown to be very effective for controlling foam accumulation.

FIG. 2 is a cross-sectional view of the foam control member of FIG. 1 as installed on a drive shaft according to principles described herein. As shown in FIG. 2, the member (100) is installed on a drive shaft (120). The drive shaft (120) is positioned through the socket (103) in the member (100). As described above, the concave portion (104) of the member (100) opens downward like an umbrella.

The member (100) may be secured to the drive shaft (120) in any of a number of ways. For example, the member (100) may be press fit, secured by adhesive, secured by a fastener, supported on a ridge of the drive shaft (120) or otherwise secured or positioned on the drive shaft.

The drive shaft (120) is connected to a motor through a motor coupler (121). In some examples, the drive shaft (120) is used to drive a pump to move ink from the reservoir. Consequently, the member (100) can be installed on the drive shaft (120) of the pump without requiring any additional hardware or power. When the pump is operated and the drive shaft (120) is driven, the member (100) rotates to control the accumulation of foam as described herein.

Figure 3:
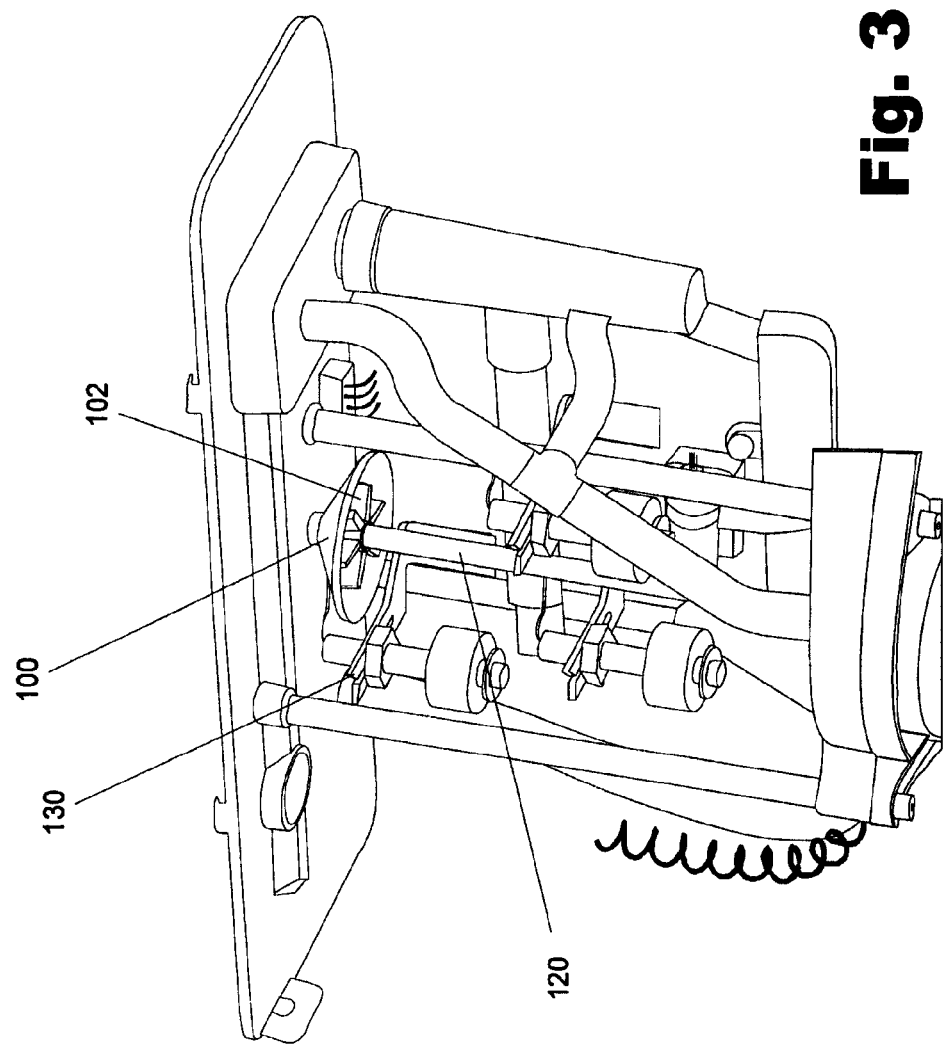
FIG. 3 is an illustration of various components interior to an ink tank, including the exemplary foam control member of FIG. 1, according to principles described herein.

FIG. 3 is an illustration of various components interior to an ink tank, including the exemplary foam control member of FIG. 1, according to principles described herein. As shown in FIG. 3, the foam control member (100) is installed on the drive shaft (120). The member (100) is disposed on the shaft (120) with the concave opening and wings facing downward toward the surface of the ink in the tank.

When the pump is operated, the shaft (120) will be driven and will rotate the member (100). As the member (100) spins above the surface of the ink, where foam accumulates, the rotating member (100) will draw foam into the concave space (104, FIG. 2). That foam will then be broken up and thrown, flung, slung or splashed by the wings (102). This action will dissipate the foam on the surface of the ink.

Moreover, the foam is dissipated over the entire surface of the ink due to the ink foam that is splashed across the ink surface by the wings (102) of the spinning member (100). Thus, a relatively small diameter member (100) dissipates foam over a much larger area.

While the member (100) is shown in FIG. 3 as being disposed on the drive shaft (130) of an ink pump, this is not necessarily so. The member (100) may be disposed on any means for rotating the member (100), including a separate, dedicated drive shaft. However, by disposing the member (100) on the already existing pump drive shaft (130), there is no need to add additional hardware to support the member (100), nor is there a need to provide additional power for operating the foam control member (100).

The maximum level of allowed foam accumulation is consequently determined by the height of the member (100) above the surface of the ink. The configuration of the member (100), the angle of the concave space (104), the size of the wings (102), etc. will determine the area over which foam is splashed and dissipated by the operation of the foam control member (100). This area can be optimized by those skilled in the art with the benefit of this disclosure for any particular application.

A bracket (130) may be added to the assembly to control and adjust the position of the foam control member (100). The bracket (130) can control the height of the foam control member (100) above the surface of the ink.

Figure 4:
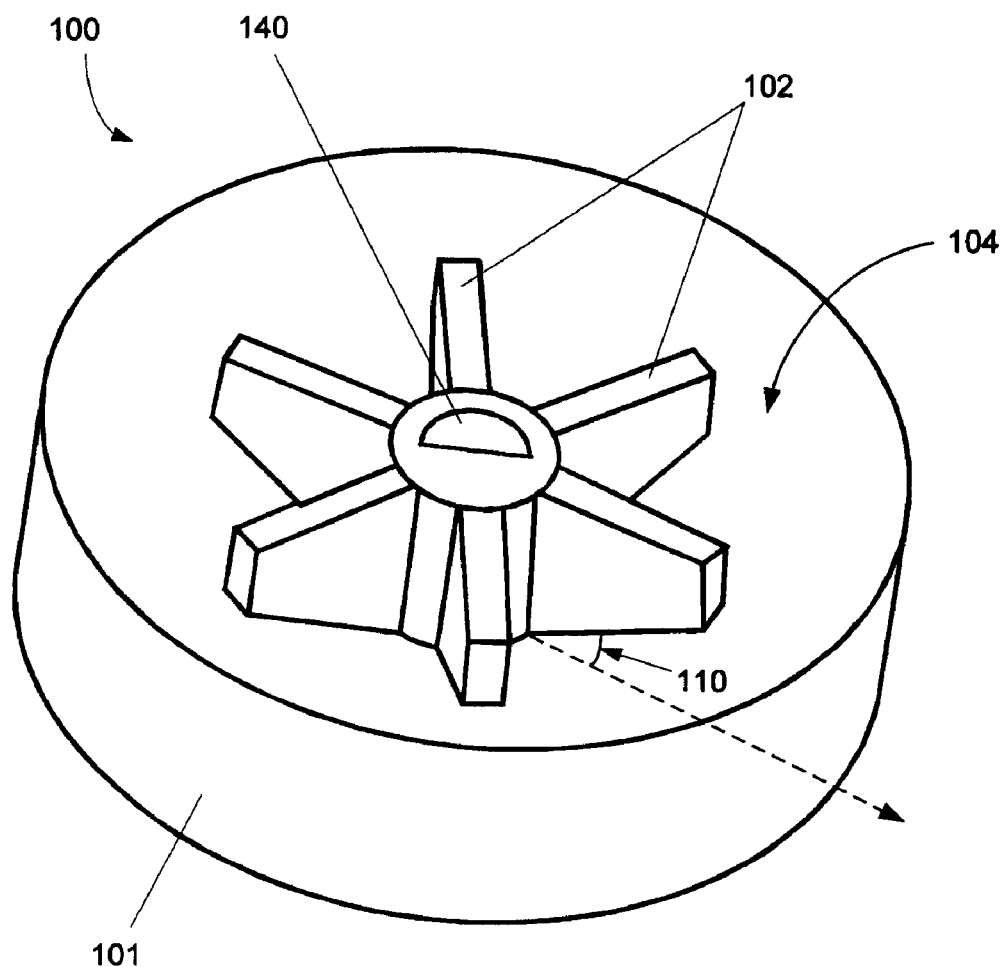
FIG. 4 is an illustration of another exemplary foam control member according to principles described herein.

FIG. 4 is an illustration of another exemplary foam control member according to principles described herein. As shown in FIG. 4, the hole or socket (140) through the center of the foam control member (100) need not be a round hole. Rather, the socket (140) may have any cross-sectional shape as matches the drive shaft or drive means on which the member (100) is installed.

In the example of FIG. 4, the socket (140) has a D-shape, i.e., a flat side and a round side. The drive shaft used with the foam control member (100) of FIG. 4 would also have a D-shaped cross section, at least for that portion passing through the socket (140). The D-shaped cross section facilitates rotation of the member (100) by the drive shaft.

In some examples, the drive shaft may have a D-shaped cross-section only at that portion of the shaft which extends through the member (100). The rest of the shaft may have a round or other-shaped cross-section. The result of such a configuration is a ridge on the drive shaft at the transition from the D-shaped portion to the round portion. This ridge can be used to support the member (100) at a desired position on the shaft.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A system for controlling foam accumulation in an ink reservoir of a printing system, said system comprising:
   an ink reservoir;
   a member comprising:
      a body, said body comprising a concave space defined therein; and
      wings extending from said body and within said concave space;

wherein said member is installed above a surface of ink in said reservoir such that said concave space opens downward facing said surface of ink; and means for rotating said member above a surface of ink in said reservoir where foam accumulates.

2. The system of claim 1, wherein said body is round.

3. The system of claim 1, wherein said means for rotating comprise a drive shaft.

4. The system of claim 1, wherein said drive shaft is a pump drive shaft for driving a pump.

5. The system of claim 1, wherein at least portion of said drive shaft has a D-shaped cross-section.

6. The system of claim 1, wherein said member further comprises a socket for rotatably driving said member.

7. The system of claim 6, wherein said socket is configured to receive a drive shaft.

8. The system of claim 6, wherein said socket has a D-shape.

9. The system of claim 1, wherein said concave space is conical.

10. The system of claim 1, wherein said concave space is parabolic.

11. The system of claim 1, wherein said concave space has a surface that makes an angle with a horizontal line drawn through said body, said angle being 35 degrees or less.

12. The system of claim 2, wherein said round body has a diameter of 50 mM.

13. The system of claim 1, wherein said wings are arranged radially around a center of said concave space.

14. The system of claim 1, further comprising a bracket for controlling a position of said member.

15. A method of controlling foam in an ink reservoir of a printing system, said method comprising rotating a foam control member above ink in said reservoir to dissipate accumulated foam, said member defining a conical concave space therein opening toward said ink and comprising wings extending from said member and within said concave space.

16. The method of claim 15, further comprising splashing foam with said rotating member over a surface of said ink in said reservoir.

17. The method of claim 15, further comprising driving said rotating member with a drive shaft that also operates a pump in said ink reservoir.

\* \* \* \* \*